183,015

BEST AVAILABLE COPY

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED DECEMBER 10, 1968

857 O.G. 367

594,994

1 - AMINO - 2 - UNSUBSTITUTED OR SUBSTITUTED - 4 - OXOHETEROCYCLICIMINO ANILINO ANTHRAQUINONES

James M. Straley and David J. Wallace, both % Tennessee Eastman Company, P.O. Box 511, Kingsport, Tenn. 37662

Filed Nov. 17, 1966. Published Dec. 10, 1968

Class 260—326.5

No Drawing. 20 Pages Specification

1-amino-4-anilinoanthraquinone compounds, in which the anilino group is substituted with a group having the formula

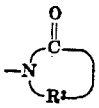

wherein $R^3$ is a chain of three to four atoms which chain atoms consist of carbon or carbon and at least one oxygen, sulfur, or nitrogen atom, are useful as dyes of hydrophobic textile materials.